US008529790B2

(12) United States Patent
Ajayaghosh et al.

(10) Patent No.: US 8,529,790 B2
(45) Date of Patent: Sep. 10, 2013

(54) WHITE LIGHT EMITTING ORGANOGEL AND PROCESS THEREOF

(75) Inventors: Ayyappanpillai Ajayaghosh, Kerala (IN); Chakkooth Vijayakumar, Kerala (IN); Vakayil K. Praveen, Kerala (IN)

(73) Assignee: Council of Scientific & Industrial Research, New Delhi (IN)

( * ) Notice: Subject to any disclaimer, the term of this patent is extended or adjusted under 35 U.S.C. 154(b) by 381 days.

(21) Appl. No.: 12/810,923

(22) PCT Filed: Jun. 13, 2008

(86) PCT No.: PCT/IN2008/000372
§ 371 (c)(1),
(2), (4) Date: Jun. 28, 2010

(87) PCT Pub. No.: WO2009/084006
PCT Pub. Date: Jul. 9, 2009

(65) Prior Publication Data
US 2010/0283006 A1 Nov. 11, 2010

(30) Foreign Application Priority Data
Dec. 28, 2007 (IN) ........................... 2749/DEL/2007

(51) Int. Cl.
C09K 11/06 (2006.01)
C09K 3/00 (2006.01)
B01D 21/01 (2006.01)
B01J 13/00 (2006.01)
C08J 3/02 (2006.01)
H01J 1/62 (2006.01)
H01J 63/04 (2006.01)

(52) U.S. Cl.
USPC .................. 252/301.16; 516/101; 313/504

(58) Field of Classification Search
USPC ................ 252/301.16; 313/504; 516/101
See application file for complete search history.

(56) References Cited

U.S. PATENT DOCUMENTS

| 4,099,089 A | 7/1978 | Rabatin |
| 4,758,818 A | 7/1988 | Vatne |
| 5,411,737 A | 5/1995 | Hsu et al. |
| 5,415,993 A | 5/1995 | Hanzalik et al. |
| 5,966,393 A | 10/1999 | Hide et al. |
| 6,635,903 B2 | 10/2003 | Kato et al. |
| 6,687,533 B1 | 2/2004 | Hirano et al. |
| 6,737,394 B2 | 5/2004 | Shana'a et al. |
| 6,774,560 B1 | 8/2004 | Smith et al. |
| 6,828,951 B2 | 12/2004 | Yamazaki et al. |
| 6,869,695 B2 | 3/2005 | Thompson et al. |
| 6,870,584 B2 | 3/2005 | Kawase et al. |
| 6,876,424 B1 | 4/2005 | Yoshihara et al. |
| 6,914,051 B1 | 7/2005 | Allen |

OTHER PUBLICATIONS

Ajayaghosh. π-Organogels of Self-Assembled p-Phenylenevinylenes: Soft Materials with Distinct Size, Shape, and Functions. Acc. Chem. Res. 2007, 40, 644-656.*
Ajayaghosh. Molecular Wire Encapsulated into p Organogels: Efficient Supramolecular Light-Harvesting Antennae with Color-Tunable Emission. Angewandte Chemie.2007, vol. 119; No. 33, pp. 6376-6381.*
Junji Kido, et al., "Multilayer White Light-Emitting Organic Electroluminescent Device", Science, vol. 267, Mar. 3, 1995, pp. 1332-1334.
Brian W. D'Andrade, et al; "White Organic Light-Emitting Devices for Solid-State Lighting**", Advanced Materials, vol. 16, No. 18, Sep. 16, 2004, pp. 1585-1595.
Yiru Sun, et al; "Management of singlet and triplet excitons for efficient white organic light-emitting devices", Nature, vol. 440, Apr. 13, 2006, pp. 908-912.
Yuichiro Kawamura, et al; "Energy transfer in polymer electrophosphorescent light emitting devices with single and multiple doped luminescent layers", Journal of Applied Physics, vol. 92, No. 1, Jul. 1, 2002, pp. 87-93.
Xiong Gong, et al; "White Electrophosphorescence from Semiconducting Polymer Blends**", Advanced Materials, vol. 16, No. 7, Apr. 5, 2004, p. 615-619.
Hameed A. Al Attar, et al; "White polymeric light-emitting diode based on a fluorine polymer/Ir complex blend system", Applied Physics Letters, vol. 86, pp. 121101-1-121101-3; published online Mar. 14, 2005.
M. Berggren, et al; "Light-emitting diodes with variable colours from polymer blends", Nature, vol. 372, Dec. 1, 1994, pp. 444-446.
Yunhua Xu, et al; "Efficient polymer white-light-emitting diodes", Applied Physics Letters, vol. 86, pp. 163502-1-163502-3, published online Apr. 14, 2005.
Guey-Kai Ho, et al; "Efficient white light emission in conjugated polymer homojunctions", Applied Physics Letters, vol. 85, No. 20, Nov. 15, 2004, pp. 4576-4578.
Tae-Ho Kim, et al; "White-Light-Emitting Diodes Based on Iridium Complexes via Efficient Energy Transfer from a Conjugated Polymer", Advanced Functional Materials, vol. 16, Published online Jan. 24, 2006, pp. 611-617.
Paolo Coppo, et al; "White-Light Emission from an Assembly Comprising Luminescent Iridium and Europium Complexes", Angewandte Chemie Ind. Ed., vol. 44, Published online: Dec. 13, 2004, pp. 1806-1810.
Yu Liu, et al; "π-Conjugated Aromatic Enynes as a Single-Emitting Component for White Electroluminescence", Journal American Chemical Society, vol. 128, pp. 5592-5593, Published on Web Apr. 7, 2006.

(Continued)

*Primary Examiner* — Carol M Koslow
*Assistant Examiner* — Matthew E Hoban
(74) *Attorney, Agent, or Firm* — Ladas & Parry LLP (57) ABSTRACT

The present invention provides white light emitting materials. The invention further provides a process for the preparation of white light emitting organogels using the concept of molecular self-assembly and partial energy transfer. The donor acceptor type molecules on coassembly and subsequent irradiation with suitable wavelength light produce white light. On irradiation, partial transfer of the excitation energy from the donor to the acceptor takes place, resulting a broad emission covering the entire range from 400-700 nm to give bright white light emission with CIE coordinates of (0.31, 0.35).

8 Claims, 6 Drawing Sheets

(56) References Cited

OTHER PUBLICATIONS

Marco Mazzeo, et al; "Bright White Organic Light-Emitting Devices from a Single Active Molecular Material", Advanced Materials, vol. 17, No. 1, Jan. 6, 2005; pp. 34-38.

A. Ajayaghosh, et al; "First Phenylenevinylene Based Organogels: Self-Assembled Nanostructures via Cooperative Hydrogen Bonding and π-Stacking" Journal American Chemical Society, vol. 123, pp. 5148-5149, Published on Web May 4, 2001.

Subi J. George, et al; "Self-Assembled Nanotapes of Oligo(*p*-phenylene vinylene)s: Sol-Gel-Controlled Optical Properties in Fluorescent π-Electronic Gels", Chem. Eur. J. vol. 11, pp. 3217-3227, XP-002499151; Published online: Feb. 25, 2005.

Ayyappanpillai Ajayaghosh, et al; "Self-Location of Acceptors as "Isolated" or "Stacked" Energy Traps in a Supramolecular Donor Self-Assembly: A Strategy to Wavelength Tunable FRET Emission", Journal American Chemical Society, vol. 128, pp. 7174-7175; Published on Web May 16, 2006.

Vakayil K. Praveen, et al; Self-Assembled π-Nanotapes as Donor Scaffolds for Selective and Thermally Gated Fluorescence Resonance Energy Transfer (FRET), Journal American Chemical Society, vol. 128, pp. 7542-7550, Published on Web May 17, 2006.

Ayyappanpillai Ajayaghosh, et al: "Cholesterol-Aided Supramolecular Control over Chromophore Packing: Twisted and Coiled Helices with Distinct Optical, Chiroptical, and Morphological Features**", Agnew. Chem. Int. Ed., vol. 45, pp. 456-460; Published online: Dec. 2, 2005.

Ayyappanpillai Ajayaghosh, et al; "Molecular Wire Encapsulated into π Organogels: Efficient Supramolecular Light-Harvesting Antennae with Color-Tunable Emission**", Angewandte Chemie Int. Ed. vol. 46, pp. 6260-6265; Published online: Jul. 2, 2007.

Ayyappanpillai Ajayaghosh, et al; "Quadrupolar π-Gels: Sol-Gel Tunable Red-Green-Blue Emission in Donor-Acceptor-Type Oligo (*p*-phenylenevinylene)s**", Advanced Materials, vol. 19, Issue 3, Feb. 2007, pp. 411-415; XP-002499152.

International Search Report: mailed Oct. 21, 2008; PCT/IN2008/000372.

* cited by examiner

WHITE LIGHT EMITTING ORGANOGEL AND PROCESS THEREOF

FIELD OF THE INVENTION

The present invention relates to white-light emitting organogel. Particularly the present invention relates to white-light emitting organogel comprising an oligo(p-phenylenevinylene) (OPV) derivative of Formula 1 as the donor and a copolymer of phenylenevinylene and pyrrolylenevinylene as the acceptor of Formula 2.

Formula 1

Donor

Formula 2

Acceptor

The present invention also relates, to a process for the preparation of white-light emitting organogel comprising an oligo(p-phenylenevinylene) (OPV) derivative of Formula 1 and a copolymer of phenylenevinylene and pyrrolylenevinylene of Formula 2. Emissions coming from the monomer and aggregates of donor along with the acceptor emission due to the energy transfer from the donor on excitation with UV light cover the entire visible region to give bright white light emission.

BACKGROUND OF THE INVENTION

White organic light emitting materials have attracted much current interest because of their potential applications in full color displays with color filters, LEDs, as backlights for liquid crystal displays (LCDs) and in various lighting applications. An important component of LCDs is the white light emitter that comprises the back light for the display since liquid crystals (LCs) do not generate light but they may only-block it. Typically, LCDs allow 5-25% of the back light to pass through. As a result, LCD technology requires a significant amount of energy, and this is an important consideration in lightweight laptops or other display designs. An efficient and spectrally broad white light source would constitute an important contribution to LCD technology. Reference may be made to Kido, J. et al. *Science* 1995, 267, 1332; D'Andrade, B. D., et al. *Adv. Mater.* 2004, 16, 1585; Sun, Y., et al. *Nature* 2006, 440, 908. U.S. Pat. Nos. 4,758,818, 6,828,951, 6,870,584, 6,876,424, 6,635,903, 6,774,560.

So far, a variety of strategies have been worked out to realize white light emission. The general approach is to blend two or three fluorescent or phosphorescent dyes into a blue-light emitting polymer or a non-active polymer matrix. Polymer blend systems, such as three-polymer blends containing red-, green-, and blue-light-emitting polymers and two-polymer blends containing blue- and orange-light-emitting polymers, have also been demonstrated. Reference may be made to Kawamura, Y. et al. *J. Appl. Phys.* 2002, 92, 87; Gong, X. et al. *Adv. Mater.* 2004, 16, 615; Al Atter, H. A. et al. *Appl. Phys. Lett.* 2005, 86, 121101; Berggren, M. *Nature* 1994, 372, 444; Xu, Y. H. *Appl. Phys. Lett.* 2005, 86, 163 502; Ho, G. K. *Appl. Phys. Lett.* 2004, 85, 4076. U.S. Pat. No. 5,966,393.

Metal complexes containing Eu, Ir are another class of molecules which are used for white light emission. Reference may be made to Kim, T.-H., et al. *Adv. Funct. Mater.* 2006, 16, 611; Coppo, P., et al. *Angew. Chem. Int. Ed.* 2005, 44, 1806.

A few low molecular weight organic molecules emitting white-light is also reported. Reference may be made to Liu, Y., et al. *J. Am. Chem. Soc.* 2006, 128, 5592; Mazzeo, M., et al. *Adv. Mater.* 2005, 17, 34.

U.S. Pat. No. 4,099,089 discloses the use of terbium activated rare earth oxyhalide phosphor material alone or in combination with other suitable phosphor materials at the elevated operating temperatures to generate white light emitting composite materials.

U.S. Pat. No. 6,869,695 discloses the fabrication of a white-light emitting OLED by using the combined monomer and aggregated emission. The device employs two emitters in a single emissive region to sufficiently cover the visible spectrum.

The main drawbacks of the above-mentioned white light emitting materials, the process includes highly complicated methods resulting in very high cost.

An alternative and easy method for the production efficient white light emission will be useful for the above-mentioned applications. White light emitting organogels are not reported in literature so far. Organogels are easy to process compared to other methods for the device manufacturing. Gelation allows greater flexibility for coating. U.S. Pat. No. 5,415,993 discloses the preparation of light-sensitive photo-thermographic emulsion layers containing a thermoreversible organogel based binder.

Organogels are extensively used in the field of medicine and cosmetics. For example U.S. Pat. No. 6,914,051 discloses a penetrating antibiotic gel for treating pain, inflammation and other pathological conditions affecting musculoskeletal tissues and other soft tissues of the body. The composition includes an antibiotic compound and a mobilizing agent in an amount sufficient to enable the antimicrobial compound to penetrate into the sub-dermal soft tissues. The antimicrobial compound may be a macrolide antibiotic compound such as azithromycin, erythromycin or roxithromycuvand the mobilizing agent may be an organogel compound, such as pluronic lecithin liposomal organogel. U.S. Pat. No. 6,687,533 discloses a non-implantable CT and MRI marker composed of an organogel. U.S. Pat. No. 5,411,737 discloses a slow release drug delivery device for the prolonged administration of topically active medicines, which consists of a vehicle in which water is soluble and in which is dissolved the topically active drug which is formed into a stable organogel with a polymer matrix with a very low water absorbing capability. U.S. Pat. No. 6,737,394 discloses a detergent composition having a surfactant, a thickening agent and an organogel, which is used for cleansing the human body.

Oligo (p-phenylenevinylene) derivatives are known to form self-assembled nanostructures, which results stable organogels in nonpolar solvents at ambient conditions. They are found to act as efficient donor scaffold for excitation energy transfer and light harvesting with suitable energy acceptors. Reference can be made to A. Ajayaghosh et al., *J. Am. Chem. Soc.* 2001, 123, 5148; A. Ajayaghosh et al., *Chem. Eur. J.* 2005, 11, 3217; A. Ajayaghosh et al., *J. Am. Chem. Soc.* 2006, 128, 7174; A. Ajayaghosh et al., *J. Am. Chem. Soc.* 2006, 128, 7542.

Formula 1 ($R=C_{12}H_{25}$, $R=C_{16}H_{33}$) and Formula 2 found to form stable organogels in aliphatic nonpolar hydrocarbon solvents like decane, hexane, Cyclohexane, methyl Cyclohexane, toluene etc. They emit in the blue region of the visible spectrum in the monomer state, whereas, green emission was observed for the self-assembled species. Reference may be made to A. Ajayaghosh et al., *Angew. Chem. Int. Ed.* 2006, 45, 456 and *Angew. Chem. Int. Ed.* 2007, 46, 6260-6265).

Until now, there has been no disclosure of white light emitting organogels. The challenge is to tailor the organogel in such a way to give broad emission covering the entire region from 400-700 nm with suitable chromaticity for white light emission when suitably excited.

OBJECTIVES OF THE INVENTION

The main objective of the present invention is to provide a white light emitting organogel.

Yet another objective is to provide a white light emitting organogel, which could give broad emission covering the entire region from 400-700 nm with suitable chromaticity for white light emission on excitation.

Yet another objective of the present invention is to provide an organogel composed of two fluorescent emitters or fluorophores dissolved in a nonpolar aliphatic solvent.

Yet another objective of the present invention is to provide a process for the preparation of white light emitting organogel.

SUMMARY OF THE INVENTION

The present invention provides a white light emitting organogel comprising at least a donor molecule of formula 1 and an acceptor molecule of formula 2 wherein $R = C_{12}H_{25}$ or $C_{16}H_{33}$

-continued

R = C$_{12}$H$_{25}$
R' = C$_8$H$_{17}$

In an embodiment of the present invention the white light emitting organogel comprising 97.5-98 mol % of the donor molecule of formula 1 and 2-2.5 mol % of the acceptor molecule of formula 2.

In yet another embodiment the white light emitting organogel has the following characteristics:
i) exhibits broad emission in the range of 400-700 nm on excitation with UV light at 350-400 nm
ii) emission at 400-700 nm contains red, green and blue colours to provide bright white light emission.
iii) exhibits (International Commission on Illumination) CIE coordinates of x=0.29-0.32 and y=0.33-0.36

In yet another embodiment the donor molecule of formula 1 used is selected from (4,4'-(1E,1'E)-2,2'-(2,5-bis(dodecyloxy)-1,4-phenylene)bis(ethene-2,1-diyl)bis(2,5-bis(dodecyloxy)-4,1-phenylene))bis(methylene)dicholesteryl dicarbonate and (4,4'-(1E,1'E)-2,2'-(2,5-bis(hexadecyloxy)-1,4-phenylene)bis(ethene-2,1-diyl)bis(2,5-bis(hexadecyloxy)-4,1-phenylene)) bis(methylene) dicholesteryl dicarbonate.

In yet another embodiment the acceptor molecule of formula 2 used is Poly(2-(2,5-didodecylstyryl)-1-dodecyl-5-(4-((E)-2-(1-dodecyl-5-((E)-prop-1-enyl)-1H-pyrrol-2-yl)vinyl)-2,5-bis(octyloxy)styryl)-1H-pyrrole).

The present invention further provides a process for the preparation white light emitting organogel comprising at least a donor molecule of formula 1 and an acceptor molecule of formula 2

Formula 1 wherein R = C$_{12}$H$_{25}$ or C$_{16}$H$_{33}$

Formula 2

R = C$_{12}$H$_{25}$
R' = C$_8$H$_{17}$ and the said process comprising the steps of:
a) encapsulating an acceptor molecule of formula 2 in a donor molecule of formula 1 in a molar ratio of 2-2.5: 97.5-98 in a nonpolar organic solvent, at a pH of 7-7.2,
b) heating the above said reaction mixture at a temperature of 55-65° C. for a period of 2-5 minutes, followed by cooling to a temperature of 25-35° C., at an atmospheric pressure to obtain the desired co-assembled gel.

In an embodiment of the present invention the donor molecule of formula 1 used in the process is selected from (4,4'-(1E,1'E)-2,2'-(2,5-bis(dodecyloxy)-1,4-phenylene)bis(ethene-2,1-diyl)bis(2,5-bis(dodecyloxy)-4,1-phenylene))bis(methylene) dichol esteryldicarbonate and (4,4'-(1E,1'E)-2,2'-(2,5-bis(hexadecyloxy)-1,4-phenyl ene)bis(ethene-2,1-diyl)bis(2,5-bis(hexadecyloxy)-4,1-phenylene))bis(methylene) dicholesteryl dicarbonate.

In another embodiment of the present invention the acceptor molecule of formula 2 used in the process is Poly(2-(2,5-didodecylstyryl)-1-dodecyl-5-(4-((E)-2-(1-dodecyl-5-((E)-prop-1-enyl)-1H-pyrrol-2-yl)vinyl)-2,5-bis(octyloxy)styryl)-1H-pyrrole).

In yet another embodiment the nonpolar organic solvent used is selected from the group consisting of decane, dodecane, hexane, cyclohexane, and methyl cyclohexane.

In yet another embodiment the nonpolar organic solvent used is preferably decane.

BRIEF DESCRIPTION OF THE ACCOMPANYING DRAWINGS

The present invention is illustrated in FIG. 1 to 4 of the drawings accompanying this specification. In the drawings like reference numbers/letters indicate corresponding parts in the various figures.

DETAILED DESCRIPTION OF THE INVENTION

In the present invention, there is provided a white light emitting organogel comprising donor acceptor type fluorescent organic molecules. Cholesterol appended oligo(p-phenylenevinylene) derivatives was used as the donor and a copolymer of phenylenevinylene and pyrrolylenevinylene with an average molecular weight (Mn) of ~4358 g/mol having a poly-dispersity index of 1.12 was the acceptor.

The donor molecules when dissolved in a nonpolar solvent like decane form self-assembled nanostructures, which results the formation of a soft organogels at room temperature. These molecules emits at blue region in the monomer state, whereas it shows green emission in the self-assembled or aggregated state.

Encapsulation of acceptor within the self-assembly of donor was done by adding small amounts of the former in decane to the latter and followed by heating and cooling to form a coassembled self-supporting soft organogel. This coassembly on excitation with 380 nm light results white light emission.

Figure 1:
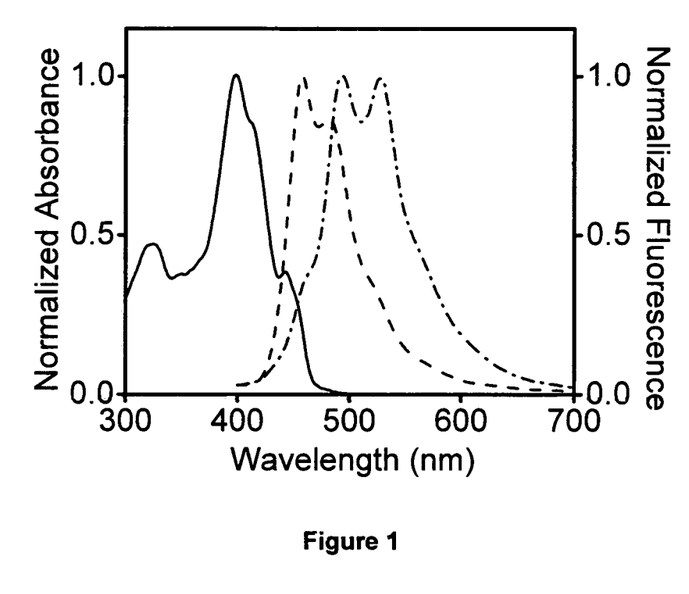
FIG. 1 represents the absorption (—), monomer emission (----) and aggregate emission (-•-•-•) of Formula 1, R=$C_{12}H_{25}$ in decane (c=$3.2 \times 10^{-4}$ M, $\lambda_{ex}$=380 nm, l=1 mm).
Figure 2:
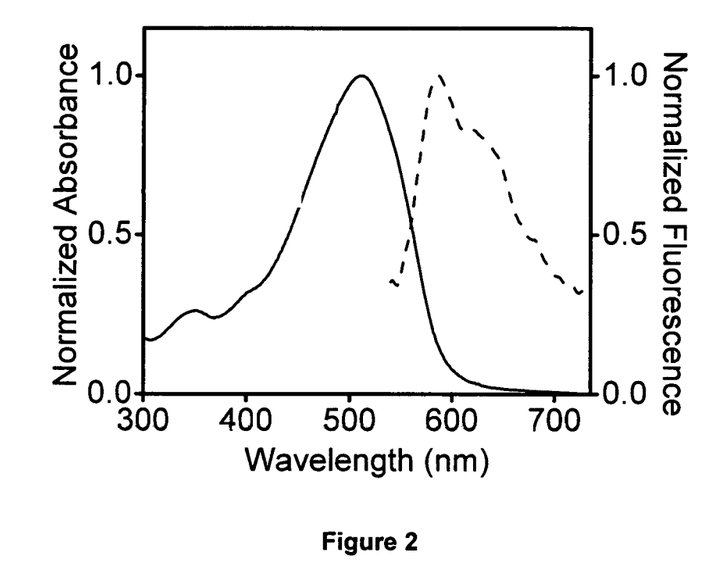
FIG. 2 represents absorption (—) and emission (----) of Formula 2 in decane ($\lambda_{ex}$=380 nm, l=1 mm).

White light emission with CIE co-ordinates of 0.31, 0.35 was observed for the organogel containing $3.2 \times 10^{-4}$ M of donor and 2.1 mol % of acceptor This donor-acceptor system is selected in view of their favorable self-assembly; stable Coassembly and suitable absorption and emission properties. The emission of the self-assembled donor is significantly shifted towards the long wavelength side when compared to that of the individual donors. In the self-assembled state, the emission of the donor shows considerable overlap with the absorption of the acceptor (FIG. 2) making it suitable for energy transfer. The spectral overlap integral, J($\lambda$) for this donor-acceptor system was found to be $4.66 \times 10^{15}$ $M^{-1}cm^{-1}nm^4$. At the excitation wavelength of the donor, the acceptor has minimum absorption thus avoiding direct excitation. Encapsulation of acceptor within the self-assembly of donor is achieved by adding small amounts of the former in decane to the latter and followed by heating and cooling to form a coassembled self-supporting soft organogel.

The following examples are given by the way of illustration and therefore should not be construed to limit the scope of the invention.

Example 1

Synthesis of Formula 1 was achieved as per Scheme 1. It was prepared by refluxing OPV alcohol (1 equivalent) with cholesteryl chloroformate (2.2 equivalents) in benzene (dry, 20 equivalents) in the presence of pyridine (dry) as the catalyst at 80° C. for 8 h. Evaporation of the solvent results in Formula 1 with yield of 86%. The residue was then dissolved in chloroform. It was then precipitated by the addition of methanol and filtered. The crude mixture was then purified to 100% by eluting through a silica column using chloroform-hexane (1:2) mixture and characterized by IR, $^1$H NMR, $^{13}$C NMR, and MALDI-TOF mass spectrometry.

This fluorophore emits blue light in the monomer state on excitation with UV light. It emits green light in the aggregated or self-assembled or gel state in nonpolar solvent medium, preferably decane, dodecane, hexane, cyclohexane, methyl cyclohexane and specifically decane at room temperature, neutral pH and atmospheric pressure.

Scheme 1

R = C$_{12}$H$_{25}$, C$_{16}$H$_{33}$

X =

Example 2

Synthesis of Formula 2 was achieved as per Scheme 2. It was prepared by refluxing a solution of bisaldehyde derivative (1 equivalent) with bisphosphonate (1 equivalent) in presence of NaH (6 equivalents) in THF (Dry, 15 equivalents). After refluxing at 80° C. for 26 h, the reaction mixture was cooled and THF was removed under reduced pressure. The resultant residue was then extracted with dichloromethane and washed several times with saturated brine and water. The organic layer dried over anhydrous Na$_2$SO$_4$ and the solvent was removed. The product thus obtained purified by repeated precipitation by adding methanol to a dichloromethane solution gave the Formula 2 as dark red solid.

This fluorophore emits red light in decane at room temperature, neutral pH and atmospheric pressure when suitably excited.

Example 3

Figure 3:
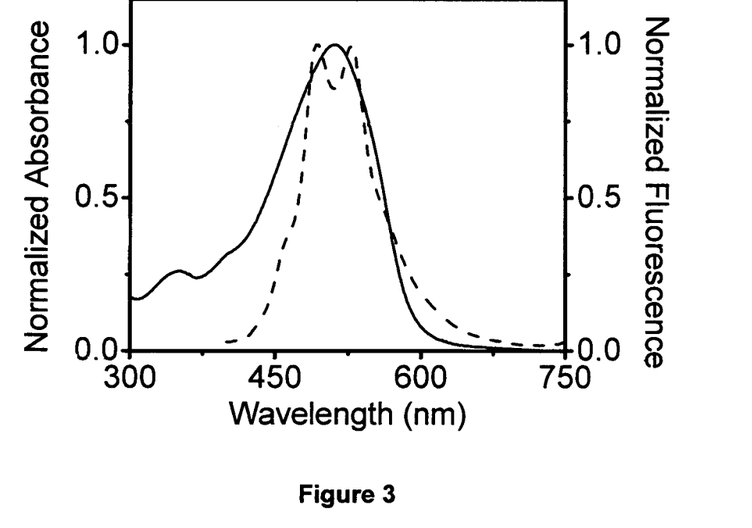
FIG. 3 represents the spectral overlap of the emission of Formula 1, R=$C_{12}H_{25}$ (red) and absorption of Formula 2 (blue) in decane.
Figure 4:
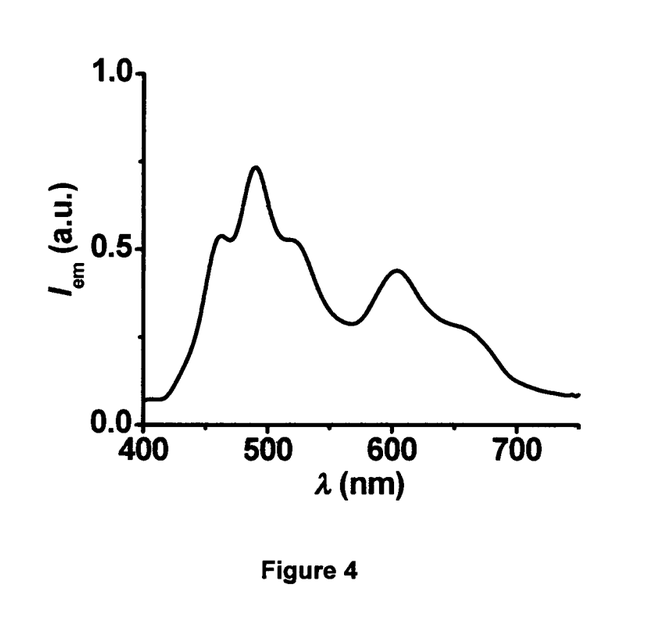
FIG. 4 represents the Fluorescence emission spectrum of Formula 1, R=$C_{12}H_{25}$ ($3.2 \times 10^{-4}$ M) in presence of 2.1 mol % of the Formula 2 ($\lambda_{ex}$=380 nm, l=1 mm).
Figure 5:
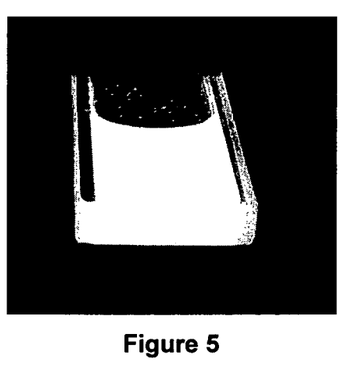
FIG. 5 represents the resulting white light emission of the organogel comprising Formula 1, R=$C_{12}H_{25}$ ($3.2 \times 10^{-4}$ M) and 2.1 mol % of Formula 2 on irradiation using 364 nm light.
Figure 6:
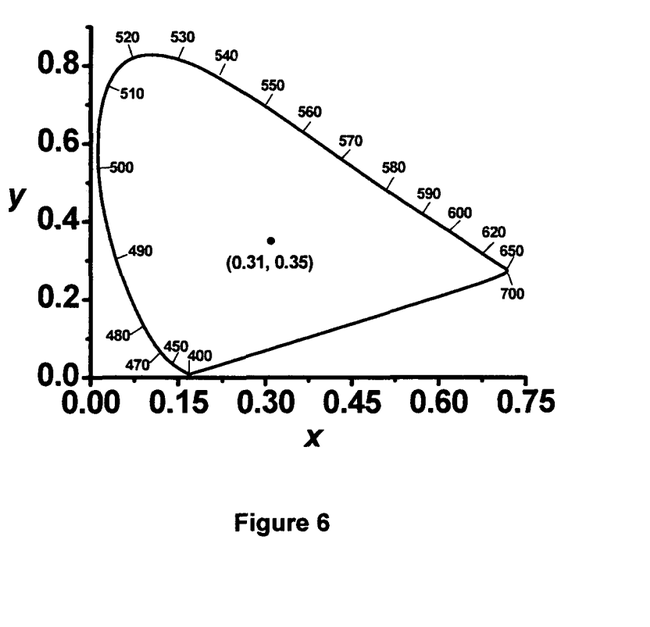
FIG. 6 represents shows the CIE coordinate diagram of the white light emission of the organogel comprising Formula 1, R=$C_{12}H_{25}$ ($3.2 \times 10^{-4}$ M) and 2.1 mol % of Formula 2 on irradiation using 380 nm light (x=0.31, y=0.35).

A coassembled gel was prepared by the encapsulation of 2.1 mol % of acceptor (Formula 2) in 97.9 mol % of the donor (Formula 1) in decane (neutral pH) and followed by heating (60° C.) and cooling (room temperature) at atmospheric pressure. On excitation of the gel with UV light (380 nm), broad emission was seen in the range of 400-700 nm (FIG. 3) which contain red, green and blue colors to give bright white light emission (FIG. 4). The white light obtained here is a combination of emissions coming from the monomer and aggregates of donor along with the acceptor emission due to the energy transfer from the donor. The chromaticity diagram at this particular composition reveals CIE co-ordinates of 0.31, 0.35 (FIG. 5) which are ideal for white light emission.

The main advantages of the present invention are:
1. A new processing method for the making of a white light emitting material with a suitable chromaticity.
2. Development of a white light emitting organogel.
3. Compared with other display and lighting technologies, white light emitting materials have the great advantage of ease of fabrication and low-cost solution processing.
4. A simple and cost effective method for the making of a white light emitting material
5. As organogel medium gives greater flexibility for coating, it is adaptable to device application.

The invention claimed is:
1. A white light emitting organogel comprising:
97.5-98 mol % of a donor molecule of Formula 1 and 2-2.5 mol % of an acceptor molecule of Formula 2

Formula 1

Scheme 2 wherein R = C₁₂H₂₅ or C₁₆H₃₃

X =

Formula 2

R = C₁₂H₂₅
R' = C₈H₁₇.

2. A white light emitting organogel according to claim 1 of the following characteristics:
   a. exhibits broad emission in the range of 400-700 nm on excitation with UV light at 350-400 nm
   b. emission at 400-700 nm contains red, green and blue colours to provide bright white light emission, and
   c. exhibits (International Commission on Illumination) CIE co-ordinates of x=0.29-0.32 and y=0.33-0.36.

3. A white light emitting organogel according to claim 1 wherein the acceptor molecule of Formula 2 is Poly(2-(2,5-didodecylstyryl)-1-dodecyl-5-(4-((E)-2-(1-dodecyl-5-((E)-prop-1-enyl)-1H-pyrrol-2-yl)vinyl)-2,5-bis(octyloxy)styryl)-1H-pyrrole).

4. A process for the preparation white light emitting organogel having a donor molecule of Formula 1 and an acceptor molecule of Formula 2

Formula 1 wherein R = C₁₂H₂₅ or C₁₆H₃₃

X =

Formula 2

R = C₁₂H₂₅
R' = C₈H₁₇ comprising the steps of:
   a) encapsulating an acceptor molecule of Formula 2 in a donor molecule of Formula 1 in a molar ratio of 2-2.5:97.5-98 in a nonpolar organic solvent, at a pH of 7-7.2, and
   b) heating the resultant reaction mixture at a temperature of 55-65° C. for a period of 2-5 minutes, followed by cooling to a temperature of 25-35° C., at an atmospheric pressure to obtain a co-assembled organogel.

5. A process according to claim 4 wherein the acceptor molecule of Formula 2 is Poly(2-(2,5-didodecylstyryl)-1-dodecyl-5-(4-((E)-2-(1-dodecyl-5-((E)-prop-1-enyl)-1H-pyrrol-2-y)vinyl)-2,5-bis(octyloxy)styryl)-1H-pyrrole).

6. A process according to claim 4 wherein the nonpolar organic solvent is selected from the group consisting of decane, dodecane, hexane, cyclohexane, and methyl cyclohexane.

7. A process according to claim 6 wherein the nonpolar organic solvent is decane.

8. A process according to claim 4 wherein the co-assembled organogel has the following characteristics:
   a. exhibits broad emission in the range of 400-700 nm on excitation with UV light at 350-400 nm
   b. emission at 400-700 nm contains red, green and blue colours to provide bright white light emission, and
   c. exhibits (international Commission on Illumination) CIE co-ordinates of x=0.29-0.32 and y=0.33-0.36.

\* \* \* \* \*